Feb. 26, 1957 C. K. WOOD 2,782,740
AGRICULTURAL IMPLEMENT
Filed June 21, 1955 2 Sheets-Sheet 1
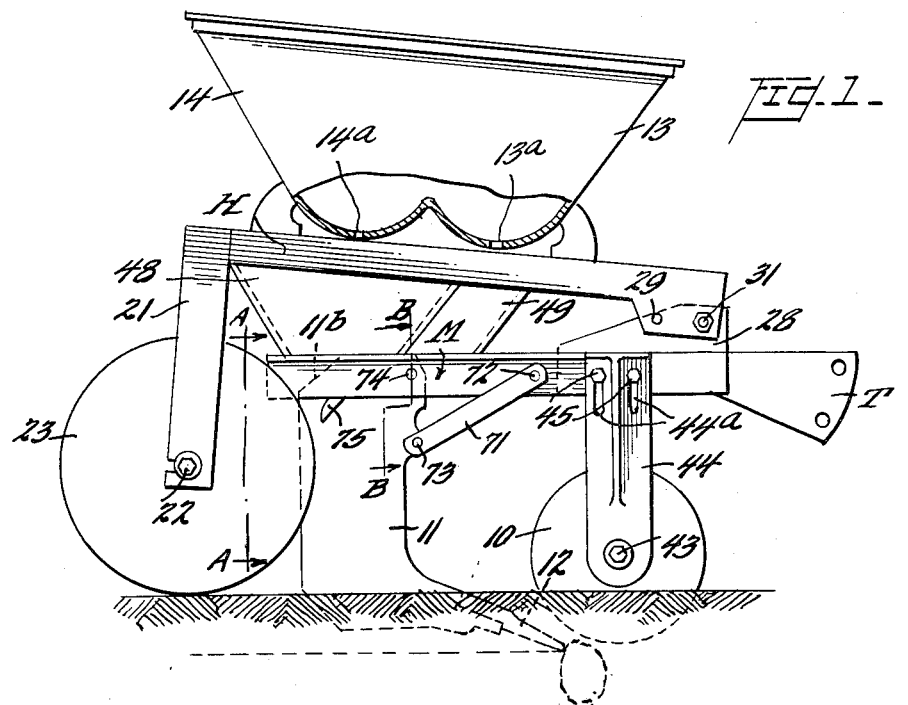
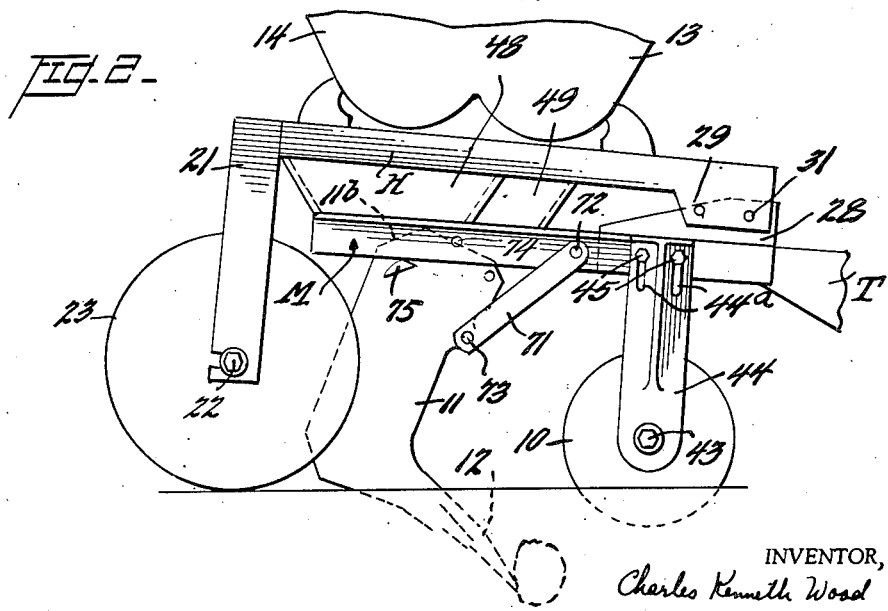
INVENTOR,
Charles Kenneth Wood
BY Watson, Cole, Grindle & Watson,
ATTORNEYS.

Feb. 26, 1957
C. K. WOOD
2,782,740
AGRICULTURAL IMPLEMENT
Filed June 21, 1955
2 Sheets-Sheet 2
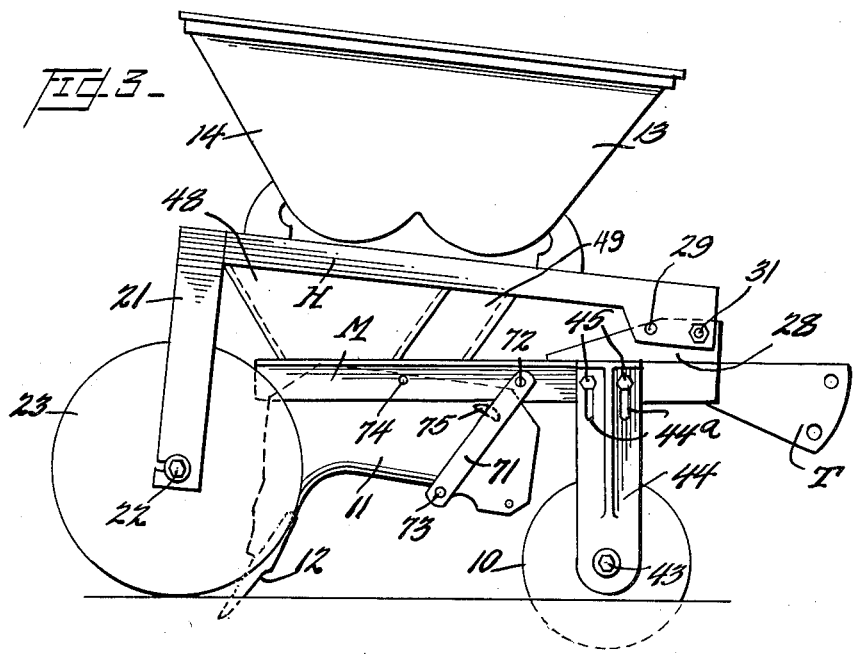
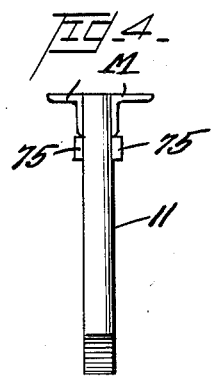
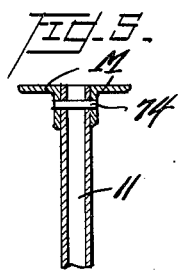
INVENTOR,
Charles Kenneth Wood
BY Watson, Cole, Grindle & Watson,
ATTORNEYS.

United States Patent Office 2,782,740
Patented Feb. 26, 1957

2,782,740
AGRICULTURAL IMPLEMENT

Charles K. Wood, Louisville, Miss., assignor to Taylor Machine Works, Louisville, Miss., a corporation of Mississippi Application June 21, 1955, Serial No. 516,980

3 Claims. (Cl. 111—52)

This invention relates to agricultural implements and particularly to implements designed and intended for use in the cultivation and fertilization of pasture lands. Pasture lands subjected to grazing frequently deteriorate unless steps are taken at timely intervals to fertilize and cultivate them, such fertilization being generally accompanied by replanting or reseeding. The general objective of this invention is to provide an entirely new sodded surface so that grazing animals may have an ample supply of food and erosion of the surface soil is prevented. For the most part, fertilization and reseeding has heretofore been carried out by conventional methods involving the use of plows or other implements for upsetting the soil, the entire upward stratum of the soil being thus turned over, following which operation or concurrently therewith, minerals and fertilizers are placed and the desired kind or quantity of seeds dposited. This method is effective but involves a substantial loss of existing sod. Another drawback of present methods lies in the loss of moisture during a dry season. Destruction of the existing sod may, of course, be avoided by refraining from upsetting the top stratum of earth with the aid of plows or discs. The fertilizing material and seeds are simply scattered over the surface of the existing pasture. Such treatment is helpful but is not efficient, inasmuch as only a relatively small proportion of the total amount of seed scattered and germinated becomes effective, and substantial loss of fertilizer and mineral substances by washing usually results.

The present invention concerns an improvement upon the implement described and claimed in the application of William A. Taylor, Serial No. 181,291, filed August 24, 1950, now Patent No. 2,739,549, patented March 27, 1956, which concerns an agricultural implement designed and constructed to accomplish the cultivation, fertilization and reseeding of pasture areas without substantial disturbance to or interference with the growth of existing sod and without loss of productive grazing time such as necessarily accompanies the resodding of a pasture by methods involving use of conventional plows and discs. This implement includes a plurality of coulters disposed in side-by-side relation and equidistantly spaced apart, each coulter being adapted to cut or incise the sod or soil surface over which the implement is drawn. The cut resulting from the operation of the coulter is substantially a vertical one. Each of the coulters is immediately followed by a seed and soil enrichment distributing boot the forward edge of which comprises a furrow opening edge. Each boot carries an incisor which extends forwardly and downwardly. The extreme forward section of the leading edge of the incisor is disposed substantially horizontally and directly under the cutting edge of the coulter. The upper surface of the incisor lies immediately adjacent to its cutting edge which is horizontally disposed, being an upwardly and rearwardly inclined substantially flat surface which cooperates with the coulter and assists that element in performing its function, by reason of its wedge action. This wedge action causes the coulter to be forced into the soil. The incisor also has the effect of forming a horizontal cut at a desired distance below the surface of the sod. The boot opens a furrow by lifting and moving laterally the two adjacent strips of sod just previously separated by the coulter and loosened from the underlying soil by the incisor and depositing in the bottom of the furrows thus formed, before it again closes, the desired quantity of minerals, fertilizer and seed.

The present patent relates specifically to an improvement in this agricultural implement whereby the boot, of which the incisor forms a part, is disengaged from the ground when the incisor strikes a rock or other immovable object beneath the sod, thus preventing breakage of the incisor and boot. By means of the implement, therefore, all existing sodded pasture can be treated and fertilized to any desired extent without substantial disturbance of the covering sod and without breakage of the incisor and boot.

One embodiment of the invention will be disclosed in detail by way of example. It will be understood by those skilled in the art that in adapting the invention to peculiar local conditions of soil and terrain minor changes and adjustments of the parts may be made to increase the efficiency of the implement in accomplishing its function. The implement selected for disclosure is illustrated in the accompanying drawings in which:

Figure 1 is a side view of the farm implement showing the incisor and boot lying beneath the soil in normal position;

Figure 2 shows the incisor and boot in the path of its rotation after striking a rock;

Figure 3 shows the incisor and boot fully rotated from the area of the rock lying beneath the soil;

Figure 4 shows a rear view of the boot on line A—A' of Figure 1; and

Figure 5 shows a cross-section of the boot and frame on line B—B' of Figure 1.

Referring in greater detail to the drawings, incisor 12 is rigidly attached in any suitable manner to the part designated generally at 11. The incisor has a horizontally disposed leading edge, relatively long as compared with the width of the coulter 10, its upper surface immediately in rear of the coulter being flat so as to comprise an upwardly inclined earth lifting or wedging surface. In rear of the flat surface the upper surface is centrally elevated to form a ridge. Each coulter 10 immediately precedes a boot 11 and all of the coulters and boots are mounted upon a main frame generally indicated at M. A second frame, generally indicated at H, is disposed above the main frame M, this second frame carrying two hoppers disposed side by side and extending transversely of the direction of movement of the machine, from one side of the machine to the other, the forward hopper being indicated at 13 and the rear hopper at 14, each hopper having apertures in its bottom. These apertures are indicated at 13a and 14a. The rear end of the hopper frame is provided with a wheeled support, having downwardly extending leg members such as 21, the lower ends of which receive and support the ends of the horizontal axle generally indicated at 22 upon which the wheels 23, preferably equipped with pneumatic tires, are mounted.

It will be understood that the wheeled support at the two sides of the hopper frame are identical in construction. The coulter 10 of each unit is provided with an axle 43 which is rotatably received within bearings formed in the lower end of parallel bracket members 44, these members being provided with parallel slots 44a through which the securing bolt 45 projects, this connection thus making it possible for the operator to adjust each coulter 10 angularly in a fore and aft direction and also vertically in order to bring about the best working relationship of coulter and incisor. The incisor extending forward at an angle slightly forward and downward, enters the ground upon initiation of the forward motion of the implement, and is impelled to operating depth by the wedging action of its design. The incisor penetrates deeper than the rolling coulter, and in turn pulls the coulter into the surface above the incisor. The dual action of the incisor, pulling itself into the soil, and compressing the soil above, between it and the coulter causes the coulter to bisect the soil above the horizontal path of the incisor. On average soil, the incisor travels at a depth of about ¾ of an inch below the coulter blade. This depth is subject to adjustment by moving the coulter up or down and also backward and forward. In hard soil the incisor is adjusted to travel up to 1½ inches below the cutting line of the coulter, but in soft and wet soil the coulter is moved slightly forward and lowered to decrease this distance. These variables are necessary in order to get consistent results under different soil conditions. Each boot comprises essentially a vertically disposed hollow tubular member preferably formed by casting, being relatively narrow or flat in transverse dimensions and elongated in the direction of movement of the implement, the leading edge of the boot being shaped so as to form a furrow opening member, wedging aside the two freshly severed sections of sod between which the coulter has cut, and the upper surface of the incisor 12, in rear of the flat portion immediately adjacent the coulter, being likewise formed with a sod parting edge to facilitate the opening of the furrow. The curved rear wall of the boot is cut away at 11b, so that one walking in the rear of the implement may observe the fall of the materials and the bottom vertical passage through the boot is completely open.

Associated with each boot is a funnel member having two funnel shaped portions, a major portion indicated at 48 and a smaller funnel portion 49. These funnels are formed of light sheet metal. Ordinarily both hopper openings 13a and 14a are positioned above the major funnel opening 48. Hence fertilizer and seed respectively, discharged from these parts, will pass into funnel 48 and thence downwardly together through the vertical passage in the boot below. It is also possible to so position the hopper frame H so that the discharge aperture 13a of the forward funnel is above the upper end of the funnel portion 49. Fertilizer descending through the minor funnel will fall upon the leading edge of the boot 11 and after entering the funnel, will be wiped by the leading edge of the boot against the faces of the parted strips of sod, a fertilizer disposition found to be very effective under some circumstances. When it is desired, however, that the fertilizer and seed be simultaneously discharged through the material conduit provided by the boot 11 the hopper frame is moved rearwardly.

Ordinarily the main frame M and the hopper frame H are pivotally connected at 31. When it is desired to connect hopper frame H and the main frame M at a point further back, this connection is made at point 29. A connecting means such as the bar designated generally at 28 joins frame H and frame M. A hitch by means of which the implement may be connected to a tractor is of relatively simple character and is indicated generally at T. Any conventional system of link members can be employed to connect this tongue to the tractor. In moving across the pasture, each coulter and boot will form therein a vertical incision or slot and this vertical slot is immediately extended and formed into a furrow by the horizontal leading edge of the incisor 12 and forward edge of the boot proper. The relationship of the coulters and incisors are such that the function of the coulter is improved, the substantially flat surface of the incisor which faces the coulter serving to wedge the coulter downwardly into the sod or soil. Suitable adjustment to the coulter of the main frame may be made to insure maximum cooperative effectiveness of coulter and incisor.

In the past, when the incisor 12 of boot 11 struck a rock or other hard and immovable object beneath the sod, the incisor and boot would be broken by the violent impact. By the employment of a unique trip-foot feature breakage may now be avoided. Boot 11 is connected to main frame M by connecting means such as a link 71 which is pivotally connected to main frame M by means of pin 72, the boot 11 being similarly connected to link 71 by means of pin 73 and being secured to main frame M by means of shear pin 74. At 75 there is shown a transverse ear or stop member, fixed on boot 11, which abuts main frame M, the ear 75 being flattened at the point of contact with main frame M to prevent denting which would result if the ear were round over its entire length. This transverse ear serves to prevent the boot 11 from protruding too far and harming funnel 48.

In operation when incisor 12 of boot 11 strikes an immovable object, the portion of boot 11 nearest the ground moves backward causing the boot to rotate in a clockwise direction about pin 73. This clockwise movement causes ear 75 to slide forward along main frame M and shear pin 74 to be broken. This movement is shown best in Figure 2. As the boot moves forward connecting bar 71 is forced to rotate in a counterclockwise direction about pin 72. In this way the incisor 12 of boot 11 is moved upwardly and outwardly from the ground until it assumes the position shown in Figure 3. The boot may then be replaced in the position shown in Figure 1, a new shear pin 74 substituted for the broken one, and the operation continued. In this simple but unique manner breakage of the incisor and boot can be completely avoided.

Having thus described the invention, what is claimed as new and desired to be secured by Letters Patent is:

1. An agricultural implement comprising a main frame supported for movement over the ground, a hopper frame supported for movement over the ground and disposed above said main frame, a forward hopper and a rear hopper supported on said hopper frame and extending transversely thereof, means pivotally connecting said hopper frame to said main frame in a plurality of positions each for movement about a horizontal axis, a plurality of hollow furrow-forming boots mounted on said frame in side-by-side relationship, each boot having a first funnel associated therewith and leading into said boot, said first funnels being of substantial fore-and-aft extent and carried by said main frame, a second funnel carried by said main frame in advance of each of said boots for conducting material downwardly to the surface of the ground independently of the boot, connecting means pivotally engaged to each of said boots and to said main frame, a shear pin securing each of said boots to said main frame, and a transversely extending stop member carried by each of said boots and disposed at a point abutting said main frame.

2. An agricultural implement as claimed in claim 1 wherein said connecting means is a link.

3. An agricultural implement as claimed in claim 1 wherein said transversely extending stop member is flattened in the area in contact with said main frame.

References Cited in the file of this patent
UNITED STATES PATENTS
2,739,549     Taylor _____ Mar. 27, 1956